US010268459B1

(12) United States Patent
Christian et al.

(10) Patent No.: US 10,268,459 B1
(45) Date of Patent: Apr. 23, 2019

(54) ANALYTIC SYSTEM THAT ELIMINATES UNNEEDED COMPUTATIONS

(71) Applicant: SAS Institute Inc., Cary, NC (US)

(72) Inventors: Stacey M. Christian, Pittsboro, NC (US); Aaron Samuel Mays, Cary, NC (US); Michael Stephen Whitcher, Apex, NC (US); Marc David Kessler, Chapel, NC (US); Andrew William Henrick, Holly Springs, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/201,012

(22) Filed: Nov. 27, 2018

Related U.S. Application Data (60) Provisional application No. 62/641,986, filed on Mar. 12, 2018, provisional application No. 62/653,010, filed on Apr. 5, 2018.

(51) Int. Cl.
*G06F 8/35* (2018.01)
*G06F 17/13* (2006.01)
*G06N 20/00* (2019.01)

(52) U.S. Cl.
CPC ............... *G06F 8/35* (2013.01); *G06N 20/00* (2019.01); *G06F 17/13* (2013.01)

(58) Field of Classification Search
CPC .. G06F 8/30; G06F 8/35; G06F 17/13; G06N 20/00
USPC .................. 717/106–109, 120–123
See application file for complete search history.

(56) References Cited

U.S. PATENT DOCUMENTS

| 2013/0116986 A1* | 5/2013 | Zhang | G06F 8/10 703/2 |
| 2013/0198713 A1* | 8/2013 | Zhang | G06F 8/10 717/106 |

OTHER PUBLICATIONS

Automatic differentiation, Wikipedia, printed Apr. 2, 2018, pp. 1-14.
V. Krishna Nandivada, CS6013—Modern Compilers: Theory and Practice, IIT Madras, Jan. 2015, pp. 11.
Bhatt et al., Peephole Optimization Technique for analysis and review of Compiler Design and Construction, IOSR Journal of Computer Engineering (IOSR-JCE), vol. 9, Issue 4, Mar. 2013, pp. 80-86.

(Continued)

*Primary Examiner* — Qing Chen
(74) *Attorney, Agent, or Firm* — Bell & Manning, LLC (57) ABSTRACT

A computing device identifies and eliminates unneeded computations from an analytic computation. A symmetric matrix includes a row and a column for each of a set of partial derivative equations where each cell includes an indicator of whether or not a direct dependency exists and is updated to include an indicator of whether or not an indirect dependency exists. A solution row is identified from the symmetric matrix that includes a requested partial derivative. A cell is identified of the identified solution row that does not include the indicator that the direct or indirect dependency exists. The column is identified from the symmetric matrix that includes the identified cell. The partial derivative equation associated with the identified column is removed from the defined set of partial derivative equations to reduce a computer processing time to compute a derivative value for the requested partial derivative.

30 Claims, 4 Drawing Sheets

(56) References Cited

OTHER PUBLICATIONS

Peephole optimization, Wikipedia, printed from the internet Apr. 12, 2018, pp. 1-4.
Anul Chaudhary, Peephole Optimization Techniques in Compiler Design, SlideShare, Apr. 12, 2016, pp. 1-14.
Berland, Havard, Automatic Differentiation, Department of Mathematical Sciences, NTNU, Sep. 14, 2006, pp. 1-22.
CS 440 Theory of Algorithms /CS 468 Algorithms in Bioinformatics, Dynamic Programming, Part II, Design and Analysis of Algorithms—Chapter 8, Pearson Addison-Wesley, 2007, 10 pages.
Floyd-Warshall algorithm, Wikipedia, printed Oct. 9, 2018, 6 pages.
SAS/OR® 14.1 User's Guide Mathematical Programming, Chapter 5, 169 pages, Jul. 2015.
SAS/EFTS 14.3—The TMODEL Procedure, Chapter 40, 25 pages, Sep. 2017.
Section V.6: Warshall's Algorithm to find Transitive Closure, 5 pages, printed from www.dartmouth.edu/~matc/DiscreteMath/V.6.pdf, printed from the internet Jul. 10, 2018.

\* cited by examiner

ANALYTIC SYSTEM THAT ELIMINATES UNNEEDED COMPUTATIONS

CROSS-REFERENCE TO RELATED APPLICATIONS

The present application claims the benefit of 35 U.S.C. § 119(e) to U.S. Provisional Patent Application No. 62/641,986 filed on Mar. 12, 2018, the entire contents of which are hereby incorporated by reference. The present application also claims the benefit of 35 U.S.C. § 119(e) to U.S. Provisional Patent Application No. 62/653,010 filed on Apr. 5, 2018, the entire contents of which are hereby incorporated by reference.

SUMMARY

In an example embodiment, a non-transitory computer-readable medium is provided having stored thereon computer-readable instructions that, when executed by a computing device, cause the computing device to identify and eliminate unneeded computations from an analytic computation. A partial derivative is generated for each equation of a system of equations with respect to a variable of a plurality of variables included in the system of equations to define a set of partial derivative equations. A symmetric matrix that includes a row and a column for each of the defined set of partial derivative equations is defined. Each cell of the symmetric matrix includes an indicator of whether or not a direct dependency exists. The direct dependency exists when a first partial derivative on a first side of a partial derivative equation associated with a respective row includes a second partial derivative on a second side of the partial derivative equation that is included in the defined set of partial derivative equations. The defined symmetric matrix is updated to include an indicator of whether or not an indirect dependency exists. The indirect dependency exists when the first partial derivative on the first side of the partial derivative equation associated with the respective row includes a third partial derivative on the second side of the partial derivative equation that depends on a fourth partial derivative included in the defined set of partial derivative equations. A solution row is identified from the symmetric matrix that includes a requested partial derivative on the first side of the partial derivative equation. A cell is identified of the identified solution row that does not include the indicator that the direct dependency exists or that the indirect dependency exists. The column is identified from the symmetric matrix that includes the identified cell. The partial derivative equation associated with the identified column is removed from the defined set of partial derivative equations to define a second set of partial derivative equations, whereby removing the partial derivative equation associated with the identified column from the defined set of partial derivative equations reduces a computer processing time to compute a derivative value for the requested partial derivative. Removing the partial derivative equation is repeated until no cell is identified that does not include the indicator that the direct dependency exists or that the indirect dependency exists. Derivative program code for the defined second set of partial derivative equations is output to compute the derivative value for the requested partial derivative when the derivative program code is executed by the computing device.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to identify and eliminate unneeded computations from an analytic computation.

In yet another example embodiment, a method of identifying and eliminating unneeded computations from an analytic computation is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

The automated generation of analytical derivatives is a common requirement of analytic procedures. When nonlinear models depend upon parameters that are themselves expected to vary across the empirical observations used to estimate these models, the numerical optimization process depends on the evaluation of numerous higher order derivatives. This class of models is known alternatively as random effects models or mixed effects models.

The standard practice of generating the required high-order derivatives using forward accumulation can lead to hundreds (if not thousands) of intermediate partial derivatives that are not actually needed. In some cases, particularly when the model equations are polynomials, as the order of the derivative increases, their dependency on lower order derivatives decreases. In a large system of nonlinear models, there can be thousands of input variables, and multiple high order derivatives with-respect-to a large set of these input variables may be requested. As the number of high order derivatives, input variables, and with-respect-to variables increase, a large collection of unused, and thus unneeded, partial derivatives are produced. Computation of these unneeded, partial derivatives can waste significant computer resources. For example, inclusion of the additional (unneeded) derivatives limits the amount of input data that can be processed through an analytical differentiator on an hourly/daily basis, which can lead to decisions based on limited information due to the reduced throughput.

Figure 1:
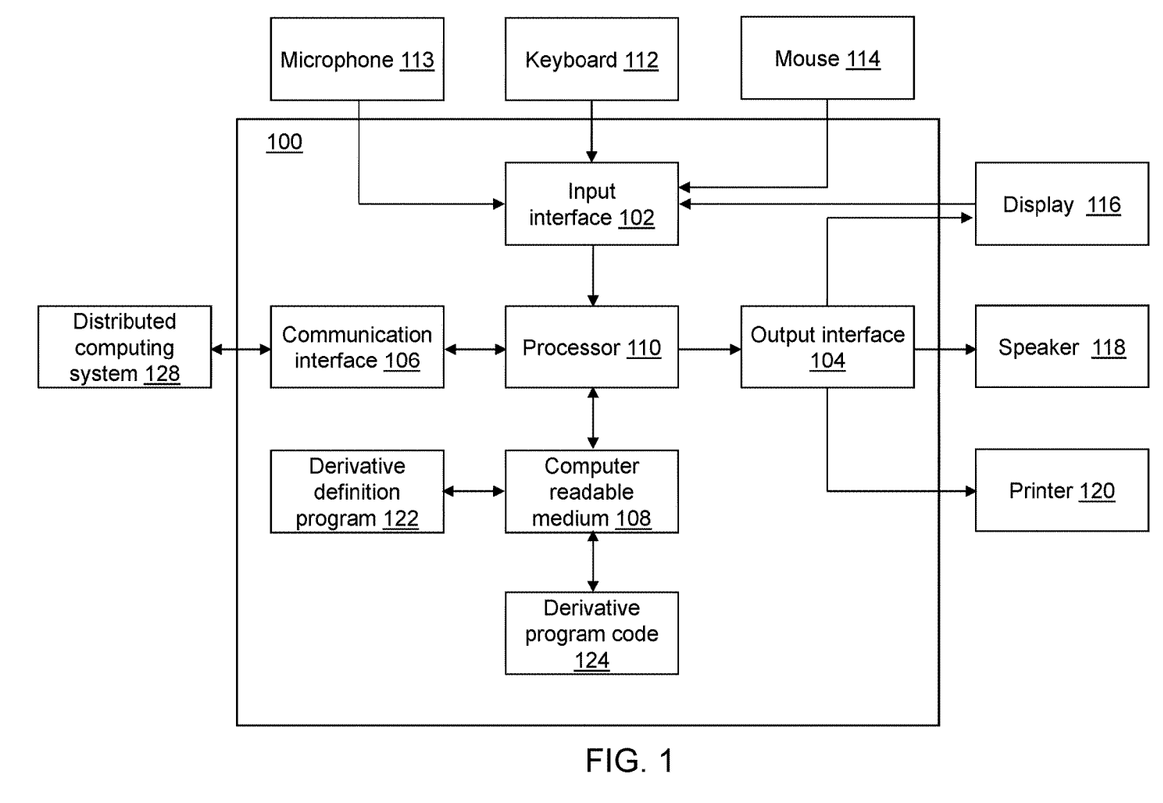
FIG. 1 depicts a block diagram of a derivative definition device in accordance with an illustrative embodiment.

Referring to FIG. 1, a block diagram of a derivative definition device 100 is shown in accordance with an illustrative embodiment. Derivative definition device 100 may automatically define program code for a derivative computation. Derivative definition device 100 may include an input interface 102, an output interface 104, a communication interface 106, a non-transitory computer-readable medium 108, a processor 110, a derivative definition program 122, and derivative program code 124. Fewer, different, and/or additional components may be incorporated into derivative definition device 100.

Derivative definition program 122 automatically defines derivative program code 124 for a derivative computation. Derivative definition program 122 removes unreferenced, also referred to as unneeded, derivatives that are generated during automatic differentiation. As a result, derivative definition program 122 reduces the computational resources required to evaluate higher (second, third, etc.) order derivatives of model programs in terms of program length, allocated memory, and execution time resulting in a technical improvement to a basic computing function in the technical area of analytic modeling. Computers are frequently tasked with automatically generating derivatives. In response to the request for automatically generating derivatives, processor 110 automatically creates code needed to compute each requested derivative. Existing versions of a derivative definition program include unneeded, partial derivatives that waste significant computer resources that limit the amount of input data that can be processed through an analytical differentiator on an hourly/daily basis, which can lead to decisions based on limited information due to the reduced throughput. By identifying and removing the unneeded, partial derivatives, derivative definition program 122 provides a technical solution to a computing problem that overcomes the bottleneck created by existing versions of a derivative definition program.

Input interface 102 provides an interface for receiving information from the user or another device for entry into derivative definition device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into derivative definition device 100 or to make selections presented in a user interface displayed on display 116.

The same interface may support both input interface 102 and output interface 104. For example, display 116 comprising a touch screen provides a mechanism for user input and for presentation of output to the user. Derivative definition device 100 may have one or more input interfaces that use the same or a different input interface technology. The input interface technology further may be accessible by derivative definition device 100 through communication interface 106.

Output interface 104 provides an interface for outputting information for review by a user of derivative definition device 100 and/or for use by another application or device. For example, output interface 104 may interface with various output technologies including, but not limited to, display 116, a speaker 118, a printer 120, etc. Derivative definition device 100 may have one or more output interfaces that use the same or a different output interface technology. The output interface technology further may be accessible by derivative definition device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Derivative definition device 100 may have one or more communication interfaces that use the same or a different communication interface technology. For example, derivative definition device 100 may support communication using an Ethernet port, a Bluetooth antenna, a telephone jack, a USB port, etc. Data and messages may be transferred between derivative definition device 100 and another computing device of distributed computing system 128 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Derivative definition device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Derivative definition device 100 also may have one or more drives that support the loading of a memory media such as a CD, DVD, an external hard drive, etc. One or more external hard drives further may be connected to derivative definition device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Derivative definition device 100 may include a plurality of processors that use the same or a different processing technology.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency response variables and improvements throughout various parts of the system.

Derivative definition program 122 performs operations associated with automatically defining program code to accomplish a derivative computation. Some or all of the operations described herein may be embodied in derivative definition program 122. The operations may be implemented using hardware, firmware, software, or any combination of these methods.

Referring to the example embodiment of FIG. 1, derivative definition program 122 is implemented in software (comprised of computer-readable and/or computer-executable instructions) stored in computer-readable medium 108 and accessible by processor 110 for execution of the instructions that embody the operations of derivative definition program 122. Derivative definition program 122 may be written using one or more programming languages, assembly languages, scripting languages, etc. Derivative definition program 122 may be integrated with other analytic tools. As an example, derivative definition program 122 may be part of an integrated data analytics software application and/or software architecture such as that offered by SAS Institute Inc. of Cary, N.C., USA. Merely for illustration, derivative definition program 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are used in a wide variety of industries to solve technical problems.

Derivative definition program 122 may be implemented as a Web application. For example, derivative definition program 122 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language file, or any other type of file supported by HTTP.

Figure 2:
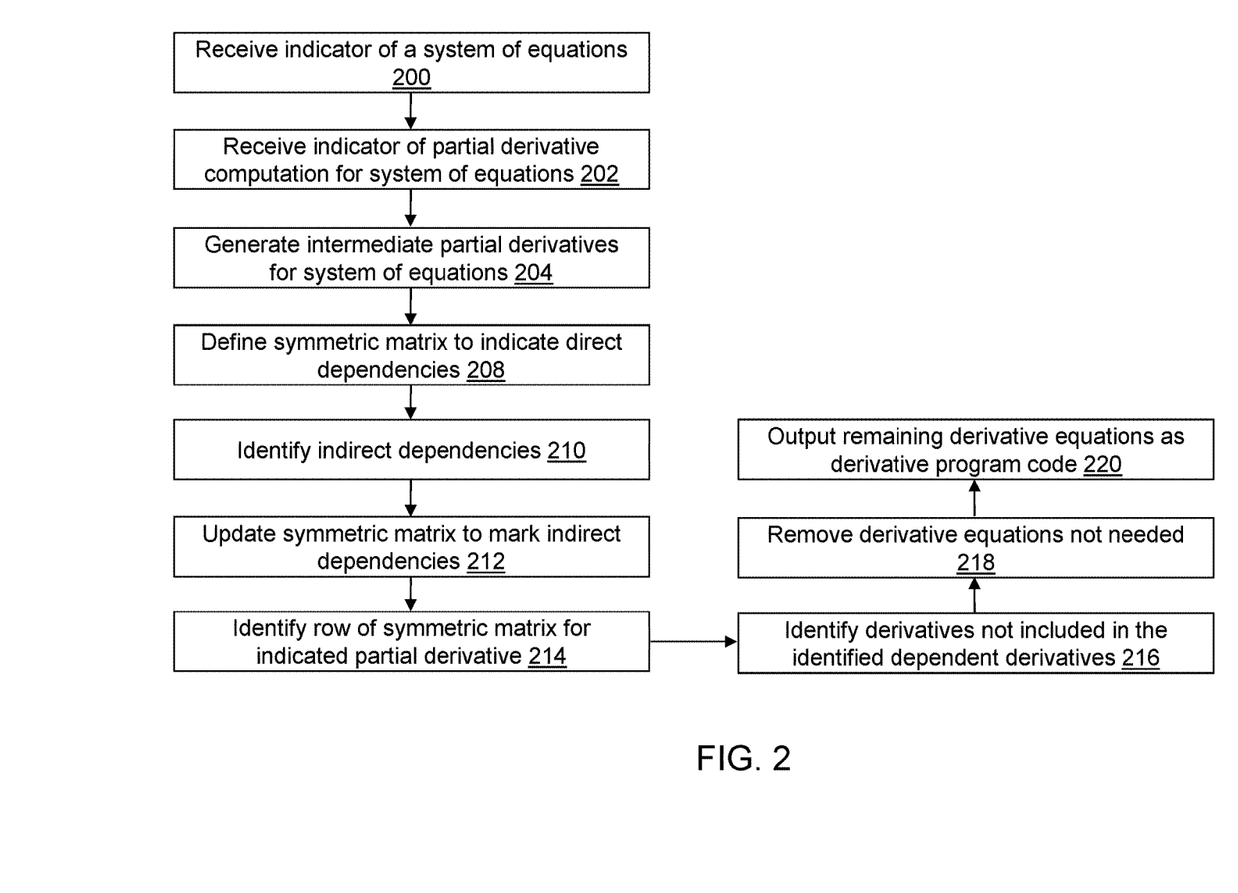
FIG. 2 depicts a flow diagram illustrating examples of operations performed by the derivative definition device of FIG. 1 in accordance with an illustrative embodiment.

Referring to FIG. 2, example operations associated with derivative definition program 122 are described. Derivative definition program 122 may be executed directly by the user or may be called by another application such as an analytic computation application 322 (shown referring to FIG. 3) with a request to define program code to accomplish a derivative computation. Additional, fewer, or different operations may be performed depending on the embodiment of derivative definition program 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute derivative definition program 122, which causes presentation of a first user interface window, which may include a plurality of menus and selectors such as drop-down menus, buttons, text boxes, hyperlinks, etc. associated with derivative definition program 122 as understood by a person of skill in the art. The plurality of menus and selectors may be accessed in various orders. An indicator may indicate one or more user selections from a user interface, one or more data entries into a data field of the user interface, one or more data items read from computer-readable medium 108, one or more data items received through communication interface 106 from another computing device of distributed computing system 128, or otherwise defined with one or more default values, etc. that are received as an input by derivative definition program 122. In an illustrative embodiment, derivative definition program 122 may be integrated with a program compiler or interpreter to automatically generate derivative program code to accomplish a derivative computation based on provided inputs.

In an operation 200, a first indicator may be received that indicates a system of equations that include a plurality of variables. The system of equations may be non-linear. The first indicator may indicate the system of equations using programming statements in a programming language or using simple text for example, from an equation editor that defines each equation. As an example, the first indicator may be received by derivative definition program 122 after selection from a user interface window, after entry by a user into a user interface window, by extracting the information from a request, by reading an input file, etc. The system of equations is a set of simultaneous equations for which a common solution is sought where an equation is a statement of an equality containing one or more variables. The system of equations may represent a modeling system used to solve a technical problem, for example, in the area of physics, chemistry, biology, engineering, etc. The system of equations includes a plurality of equations that involve the same plurality of variables that are related through the mathematical functions included in each equation. The mathematical functions may relate the variables in a linear or a polynomial manner, may include trigonometric terms such as sine, cosine, tangent, arctangent, hyperbolic sine, etc., may include logarithmic terms using different base values, etc.

Each equation may include one or more parameters that have constant values and can be arranged to include a single variable on a first side of an equal sign and one or more variables and/or one or more parameters related by one or more mathematical functions (plus, minus, multiply, divide, sin, log, natural log, a power that can be positive or negative and integer or fractional, etc.) on a second side of the equal sign. For example, the first side may be a left side, and the second side may be a right side. The plurality of variables includes a first plurality of variables and a second plurality of variables. The first plurality of variables includes each single variable included on the first side of the equal sign of each equation of the plurality of equations. The second plurality of variables includes the one or more variables on the second side of the equal sign of each equation of the plurality of equations. A variable may be included in both the first plurality of variables and the second plurality of variables. The first plurality of variables may be referred to as independent variables, and the second plurality of variables may be referred to as dependent variables.

To solve many technical problems in the areas of physics, chemistry, biology, engineering, etc., differential equations are used to model processes that involve one or more successive rates of change of a variable. For example, as well-understood, a first derivative of a variable may be associated with first rate of change, a second derivative may be associated with a second rate of change of the first rate of change, etc. A differential equation is a mathematical equation that defines one or more derivatives of a variable based on its definition in an equation. A partial differential equation is a differential equation that contains a plurality of variables and their partial derivatives. A partial differential equation can be used to describe a wide variety of phenomena such as sound, heat, electrostatics, electrodynamics, fluid flow, elasticity, quantum mechanics, etc.

In an operation 202, a second indicator may be received that indicates a partial derivative computation to define based on the system of equations. The second indicator may indicate the partial derivative computation using programming statements in a programming language, using text, for example, from an equation editor, using text boxes or drop-down selectors to define the variables involved, etc. As an example, the second indicator may be received by derivative definition program 122 after selection from a user interface window, after entry by a user into a user interface window, by extracting the information from a request, by reading an input file, etc. The second indicator indicates an independent variable of the first plurality of variables and one or more dependent variables of the second plurality of variables. The one or more dependent variables form an ordered set of variables, where a number of the one or more dependent variables defines a derivative order. For example, the second indicator may indicate a second order partial derivative, such as $$\frac{\partial^2 y}{\partial x \partial z},$$

which includes a first variable y that is an independent variable of the first plurality of variables, and a second variable x and a third variable z that are dependent variables of the second plurality of variables. The derivative order is two.

In an operation 204, intermediate partial derivative equations are generated for the system of equations using forward accumulation automated differentiation to generate all full and partial derivative equations for each equation up to the derivative order indicated by the second indicator. A partial derivative equation is defined for each of the first plurality of variables as a function of each of the ordered set of variables indicated by the second indicator. For example, given the system of equations, $$d=bc;$$

$$f=(e^{-a})(\cos(d))/\sin(c);$$

defined by the first indicator and the partial derivative computation to define defined by "@@f/@a/@b", which is a second order derivative of f with respect to a and b, the following intermediate partial derivative equations are generated:

$$@d/@b=c;$$

$$@f/@a=(-e^{-a})(\cos(d))/\sin(c)$$

$$@f/@b=(e^{-a})(@d/@b)(-\sin(d))/\sin(c);$$

$$@@f/@a/@b=-(@f/@b);$$

using forward accumulation automated differentiation where @ represents a short hand notation for a derivative.

In an operation 208, a symmetric matrix is defined based on an interpretation of the generated intermediate partial derivative equations to indicate direct dependencies between them. Each partial derivative on the first side of each equation is represented by a row and a column of the symmetric matrix. A dimension of the symmetric matrix is n×n where n is a number of equations included in the system of equations. Each row and each column may be referred to using an equation number of the partial derivative on the first side of each equation for simplicity. For example, $$@d/@b=c;$$ [equation 1 column 1 and row 1 of the symmetric matrix]

$$@f/@a=(-e^{-a})(\cos(d))/\sin(c)$$ [equation 2 column 2 and row 2 of the symmetric matrix]

$$@f/@b=(e^{-a})(@d/@b)(-\sin(d))/\sin(c);$$ [equation 3 column 3 and row 3 of the symmetric matrix]

$$@@f/@a/@b=-(@f/@b);$$ [equation 4 column 4 and row 4 of the symmetric matrix]

The symmetric matrix may be initialized with a zero in each cell except for the diagonal cells that include a one because each row/equation of the symmetric matrix depends on itself. Each row/equation of the symmetric matrix may be processed sequentially with the second side of the equation reviewed to identify any partial derivatives. The zero in a column associated with any identified partial derivative is replaced with a one. Inclusion of the one indicates a direct dependency. For illustration, for the example above, the following symmetric matrix is generated:

| Partial derivative | @d/@b | @f/@a | @f/@b | @@f/@a/@b |
|---|---|---|---|---|
| @d/@b | 1 | 0 | 0 | 0 |
| @f/@a | 0 | 1 | 0 | 0 |
| @f/@b | 1 | 0 | 1 | 0 |
| @@f/@a/@b | 0 | 0 | 1 | 1 |

The partial derivative @f/@b is a partial derivative on the first side of the third equation that includes a partial derivative on the right side: @f/@b=(e$^{-a}$) (@d/@b) (-sin(d))/sin (c). A one replaces the zero in the first column and third row because the first equation defines the partial derivative on the right side of the third equation. The partial derivative @@f/@a/@b is a partial derivative on the first side of the fourth equation that includes a partial derivative the right side: @@f/@a/@b=-(@f/@b). A one replaces the zero in the third column and fourth row because the third equation defines the partial derivative on the right side of the fourth equation.

In an operation 210, indirect dependencies are identified by applying Warshall's transitive closure algorithm on the symmetric matrix. When a desired derivative A depends on B, and B depends on C, A has an indirect dependency on C.

In an operation 212, the symmetric matrix is updated to indicate indirect dependencies between the generated intermediate partial derivative equations identified by applying Warshall's transitive closure algorithm. C. For illustration, the following code applies Warshall's transitive closure algorithm and updates the symmetric matrix indicated by a "matrix" variable having a number of rows and a number of columns of length indicated by a "size" variable.

```
void der_matrix_closure(matrix, size)
    unsigned long **matrix;
    unsigned long size;
```

```
{
    unsigned long i, j, k;
    /* Perform the transitive closure */
    for (k = 0; k < size; k++) {
        for (i = 0; i < size; i++) {
            for (j = 0; j < size; j++) {
                /* If a dependency k is on the path from i to j */
                /* then mark matrix[i][j] as dependent */
                if (matrix[i][k] && matrix[k][j]) {
                    /* Update the dependency matrix */
                    if (i < size && j < size)
                        matrix[i][j] = 1;
                }
            }
        }
    }
}
```

For illustration, for the example above, the following is the updated symmetric matrix:

| Partial derivative | @d/@b | @f/@a | @f/@b | @@f/@a/@b |
|---|---|---|---|---|
| @d/@b | 1 | 0 | 0 | 0 |
| @f/@a | 0 | 1 | 0 | 0 |
| @f/@b | 1 | 0 | 1 | 0 |
| @@f/@a/@b | 1 | 0 | 1 | 1 |

The partial derivative @@f/@a/@b includes an indirect dependency on @d/@b because @@f/@a/@b=−(@f/@b) and @f/@b=($e^{-a}$) (@d/@b) (−sin(d))/sin(c). A one replaces the zero in the first column and fourth row because the first equation defines the partial derivative needed to compute the right side of the fourth equation.

In an operation 214, a row of the updated symmetric matrix that includes the partial derivative computation indicated by the second indicator is identified. For illustration, in the example above, the fourth row includes the partial derivative computation indicated by the second indicator, @@f/@a/@b.

In an operation 216, any column of the identified row that includes a zero is identified as a partial derivative computation that is not needed to compute the partial derivative computation indicated by the second indicator. For example, the fourth row of the symmetric matrix includes a zero in the second column which indicates that the partial derivative computation for @@f/@a/@b does not need @f/@a for its computation.

In an operation 218, any generated intermediate partial derivative equation of the generated intermediate partial derivative equations identified in operation 216 is removed from the generated intermediate partial derivative equations. For example, the second generated intermediate partial derivative equation @f/@a=(−e−a) (cos(d))/sin(c) is not needed to compute the partial derivative for @@f/@a/@b and is removed, which results in the following set of partial derivative equations:

@d/@b=c;

@f/@b=($e^{-a}$)(@d/@b)(−sin(d))/sin(c);

@@f/@a/@b=−(@f/@b);

In an operation 220, the remaining intermediate partial derivative equations are output to derivative program code 124. The remaining intermediate partial derivative equations may be output in any programming language or as equations. As an example, derivative program code 124 may be stored on computer-readable medium 108. Derivative program code 124 further may be output through output interface 104 to display 116, speaker 118, or printer 120. For example, derivative program code 124 may be presented on display 116 in a user interface window or printed on printer 120. Derivative program code 124 further may be output through communication interface 106 to a non-transitory computer-readable medium, a display, a speaker, or a printer of a computing device of distributed computing system 128 or in a response to a request from a computing device of distributed computing system 128 or from an analytic computation device 300.

Figure 3:
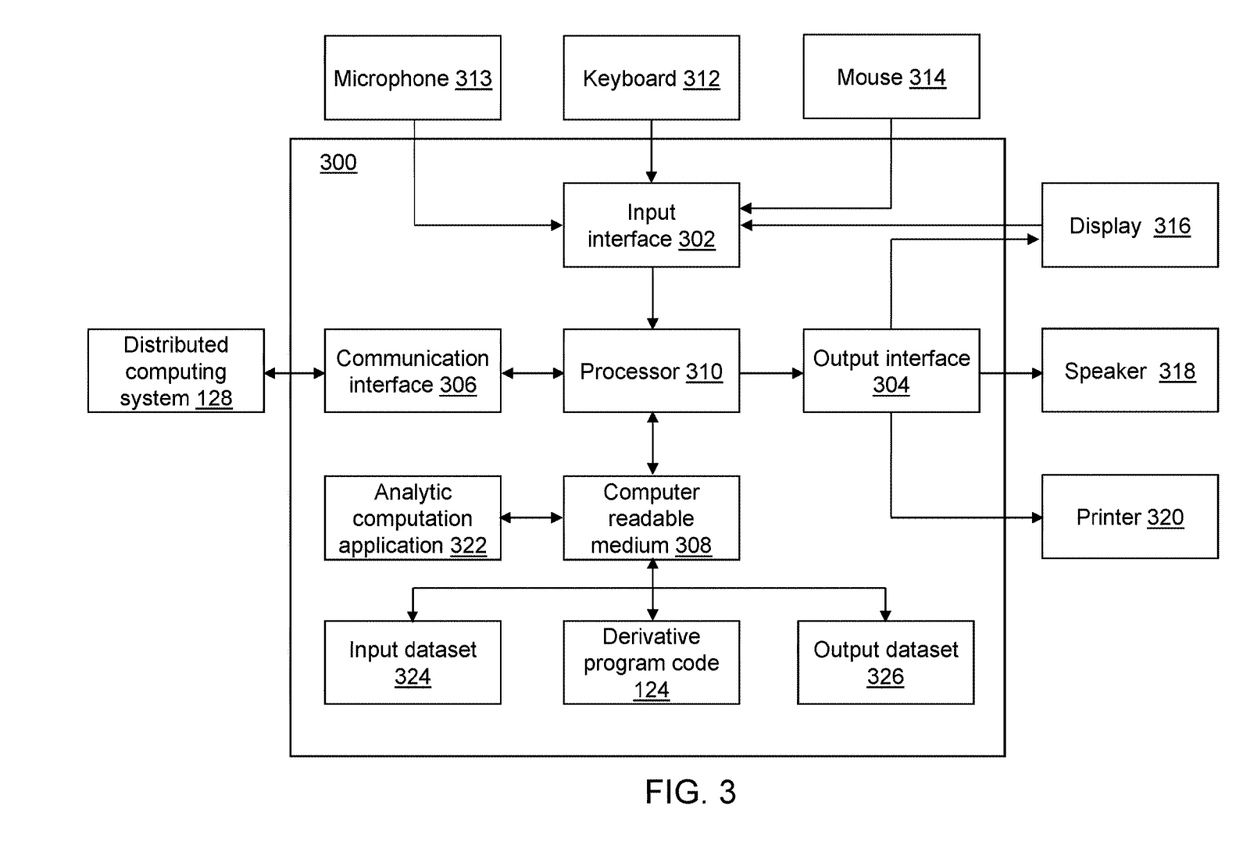
FIG. 3 depicts a block diagram of an analytic computation device in accordance with an illustrative embodiment.

Referring to FIG. 3, a block diagram of an analytic computation device 300 is shown in accordance with an illustrative embodiment. Analytic computation device 300 may include a second input interface 302, a second output interface 304, a second communication interface 306, a second non-transitory computer-readable medium 308, a second processor 310, an analytic computation application 322, input data 324, derivative program code 124, and an output dataset 326. Fewer, different, and additional components may be incorporated into analytic computation device 300. Analytic computation device 300 and/or derivative definition device 100 may be members of distributed computing system 128 or integrated in a single device.

Second input interface 302 provides the same or similar functionality as that described with reference to input interface 102 of derivative definition device 100 though referring to analytic computation device 300. Second output interface 304 provides the same or similar functionality as that described with reference to output interface 104 of derivative definition device 100 though referring to analytic computation device 300. Second communication interface 306 provides the same or similar functionality as that described with reference to communication interface 106 of derivative definition device 100 though referring to analytic computation device 300. Data and messages may be transferred between analytic computation device 300 and derivative definition device 100 using second communication interface 306. Second computer-readable medium 308 provides the same or similar functionality as that described with reference to computer-readable medium 108 of derivative definition device 100 though referring to analytic computation device 300. Second processor 310 provides the same or similar functionality as that described with reference to processor 110 of derivative definition device 100 though referring to analytic computation device 300.

Analytic computation application 322 performs operations associated with creating and executing program code for an analytic computation. Some or all of the operations described herein may be embodied in analytic computation application 322. The operations may be implemented using hardware, firmware, software, or any combination of these methods. Referring to the example embodiment of FIG. 3, analytic computation application 322 is implemented in software (comprised of computer-readable and/or computer-executable instructions) stored in second computer-readable medium 308 and accessible by second processor 310 for execution of the instructions that embody the operations of analytic computation application 322. Analytic computation application 322 may be written using one or more programming languages, assembly languages, scripting languages, etc. Analytic computation application 322 may be implemented as a Web application. Derivative definition program 122 and analytic computation application 322 may be parts of the same application, may be separate applications, or may be integrated applications that are designed to interact with each other, for example, through an application programming interface.

Analytic computation application 322 may be integrated with other analytic tools. As an example, analytic computation application 322 may be part of an integrated data analytics software application and/or software architecture such as that offered by SAS Institute Inc. of Cary, N.C., USA. Merely for illustration, analytic computation application 322 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Input dataset 324 may include, for example, a plurality of rows and a plurality of columns. The plurality of rows may be referred to as observation vectors or records (observations), and the columns may be referred to as variables. In an alternative embodiment, input dataset 324 may be transposed. An observation vector is defined as $x_j$ that may include a value for each of the plurality of variables associated with the observation j. Each variable of the plurality of variables may describe a characteristic of a physical object. For example, if input dataset 324 includes data related to operation of a vehicle, the variables may include an oil pressure, a speed, a gear indicator, a gas tank level, a tire pressure for each tire, an engine temperature, a radiator level, etc. Input dataset 324 may include data captured as a function of time for one or more physical objects.

The data stored in input dataset 324 may be generated by and/or captured from a variety of sources including one or more sensors of the same or different type, one or more computing devices, etc. The data stored in input dataset 324 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in input dataset 324 for analysis and processing to be performed using an analytic model that may itself be defined using a programming language integrated with derivative definition program 122 and/or analytic computation application 322.

Input dataset 324 may be stored on second computer-readable medium 308 and/or on one or more computer-readable media of distributed computing system 128 and accessed by derivative definition device 100 using second communication interface 306, second input interface 302, and/or second output interface 304. Data stored in input dataset 324 may be sensor measurements or signal values captured by a sensor, may be generated or captured in response to occurrence of an event or a transaction, generated by a device such as in response to an interaction by a user with the device, etc. The data stored in input dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 324 may be captured at different time points periodically, intermittently, when an event occurs, etc. One or more columns of input dataset 324 may include a time and/or date value.

Input dataset 324 may include data captured under normal operating conditions of the physical object. Input dataset 324 may include data captured at a high data rate such as 200 or more observation vectors per second for one or more physical objects. For example, data stored in input dataset 324 may be generated as part of the Internet of Things (IoT), where things (e.g., machines, devices, phones, sensors) can be connected to networks and the data from these things collected and processed within the things and/or external to the things before being stored in input dataset 324. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 324.

Input dataset 324 may be stored using various data structures as known to those skilled in the art including one or more files of a file system, a relational database, one or more tables of a system of tables, a structured query language database, etc. on analytic computation device 300 and/or on distributed computing system 128. Analytic computation device 300 may coordinate access to input dataset 324 that is distributed across distributed computing system 128 that may include one or more computing devices. For example, input dataset 324 may be stored in a cube distributed across a grid of computers as understood by a person of skill in the art. As another example, input dataset 324 may be stored in a multi-node Hadoop® cluster. For instance, Apache™ Hadoop® is an open-source software framework for distributed computing supported by the Apache Software Foundation. As another example, input dataset 324 may be stored in a cloud of computers and accessed using cloud computing technologies, as understood by a person of skill in the art. The SAS® LASR™ Analytic Server may be used as an analytic platform to enable multiple users to concurrently access data stored in input dataset 324. The SAS® Viya™ open, cloud-ready, in-memory architecture also may be used as an analytic platform to enable multiple users to concurrently access data stored in input dataset 324. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 4:
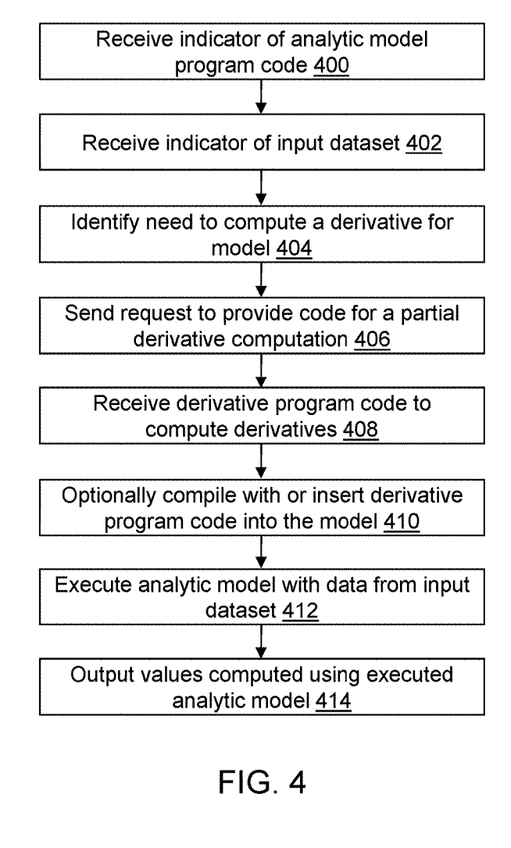
FIG. 4 depicts a flow diagram illustrating examples of operations performed by the analytic computation device of FIG. 3 in accordance with an illustrative embodiment.

Referring to FIG. 4, example operations associated with analytic computation application 322 are described. For example, analytic computation application 322 may be used to create output dataset 326 from input dataset 324. Additional, fewer, or different operations may be performed depending on the embodiment of analytic computation application 322. The order of presentation of the operations of FIG. 4 is not intended to be limiting. Although some of the operational flows are presented in sequence, the various operations may be performed in various repetitions, concurrently (in parallel, for example, using threads), and/or in other orders than those that are illustrated. For example, a user may execute analytic computation application 322, which causes presentation of a first user interface window, which may include a plurality of menus and selectors such as drop-down menus, buttons, text boxes, hyperlinks, etc. associated with analytic computation application 322 as understood by a person of skill in the art. The plurality of menus and selectors may be accessed in various orders. An indicator may indicate one or more user selections from a user interface, one or more data entries entered into a data field of the user interface, one or more data items read from second computer-readable medium 308 or otherwise defined with one or more default values, etc. that are received as an input by analytic computation application 322.

In an operation 400, a third indicator of an analytic model program code to use to perform an analytic computation on the observations of input dataset 324 is received. For example, the analytic model program code may be created by a user using a user interface window presented on a second display 316 using a second keyboard 312, a second microphone 313, and/or a second mouse 314. As another option, the analytic model program code may have been created previously and received by reading the analytic model program code from second non-transitory computer-readable medium 308 or a non-transitory computer-readable medium of a computing device of computing system 128. As still another option, the analytic model program code may be created by a user using a user interface window presented on a display using a keyboard, a microphone, and/or a mouse of a computing device of computing system 128.

The analytic model program code may be written using one or more programming languages, assembly languages, scripting languages, etc. The analytic model program code may be used as part of a model training, validating, and/or scoring process to provide a prediction, an optimization, a forecast, etc. based on the observations included input dataset 324. The prediction, optimization, forecast, etc. identify a predicted characteristic of each observation vector included in input dataset 324.

In an operation 402, a fourth indicator may be received that indicates input dataset 324. For example, the first indicator indicates a location and a name of input dataset 324. As an example, the first indicator may be received by analytic computation application 322 after selection from a user interface window, after entry by a user into a user interface window, by extracting the information from a request, by reading an input file, etc. In an alternative embodiment, input dataset 324 may not be selectable. For example, a most recently created dataset may be used automatically. As another alternative embodiment, the fourth indicator may be included in the analytic model.

In an operation 404, one or more derivatives needed by the analytic model program code are identified. For example, the analytic model program code may include a statement that indicates a derivative computation such as GETDER (x,a,b), which indicates computation of a second derivative of x with respect to a and b after a system of equations that include variables x, a, and b. As another example, a procedure such as the TMODEL procedure included in SAS/ETS® or the OPTMODEL procedure included in SAS/OR®, may automatically generate program code (statements) to evaluate derivatives for objective expressions and nonlinear constraints when submitted for execution. In this illustrative embodiment, operations 404 to 412 are performed when a user requests execution of the analytic model program code without additional input from the user.

In an operation 406, a request to provide code to compute a partial derivative of the determined one or more derivatives is sent, for example, to derivative definition program 122 executing at derivative definition device 100. The request may include the system of equations in addition to a partial derivative of the determined one or more derivatives in one or more requests. The request further may include a plurality of the determined one or more derivatives. In an alternative embodiment, a request may not be sent from analytic computation application 322 to derivative definition program 122 based on the integration implemented between analytic computation application 322 and derivative definition program 122. For example, as part of executing the analytic model, operations 204 to 220 of FIG. 2 may be performed as part of a function or a procedure call.

In an operation 408, a response to the request that includes derivative program code 126 or an indicator of where derivative program code 126 is located is received. In an alternative embodiment, a response may not be received from derivative definition program 122 based on the integration implemented between analytic computation application 322 and derivative definition program 122. For example, as part of executing the analytic model, derivative program code 126 may be received as a result of a function or a procedure call.

In an operation 410, derivative program code 126 may be compiled with other code included in the analytic model program code depending on the programming language used to define the analytic model program code. For example, some programming languages do not require compilation before being executed. When compilation is not needed, derivative program code 126 may be inserted in the analytic model program code. For illustration, based on the example above, derivative program code 126 is inserted as shown below:

$d=bc;$ $@d/@b=c;$ $f=(e-a)(\cos(d))/\sin(c);$ $@f/@b=(e-a)(@d/@b)(-\sin(d))/\sin(c);$ $@@f/@a/@b=-(@f/@b);$ In an operation 412, the analytic model including derivative program code 126 is executed with observations read from input dataset 324. As another option, the analytic model may be instantiated using an event stream processor such as the SAS® Event Stream Processing Engine (ESPE), developed and provided by SAS Institute Inc. of Cary, N.C., USA, and data from input dataset 324 may be streamed to the executing analytic model.

In an operation 414, output values generated as a result of execution of the analytic model are output. For example, the output values may be output to output dataset 326. The output values further may be output through second output interface 304 to a second display 316, a second speaker 318, or a second printer 320. The output values further may be output or streamed through second communication interface 306 to a non-transitory computer-readable medium, a display, a speaker, or a printer of a computing device of distributed computing system 128 or in a response to a request from a computing device of distributed computing system 128.

While the example is fairly simple, in complex random effects models there may be hundreds of statements with thousands of generated derivatives. The unreferenced derivatives are far from obvious, even to a human. Derivative definition program 122 is highly efficient at identifying the unneeded derivatives and can significantly reduce computer run-time of models including optimization models. For example, derivative definition program 122 can remove as much as 75% of the generated code statements. For optimization problems where the program is run iteratively (e.g., convergence criteria that may require thousands of iterations) across millions of rows of data, derivative program code 126 created by derivative definition program 122 allows problems to be solved in minutes instead of hours.

For example, the program below is an illustration of an analytic model that models a concentration of drugs over time in a one-compartment pharmacokinetic model of the human body. In this nonlinear random effects model, the drug is administered orally and its introduction into the body is represented with a first order absorption term, first order absorption rate constant, the "ka" variable. A concentration in a body, the "c" variable, is computed as a function of the first order absorption rate constant, the "ka" variable, an elimination rate constant, the "ke" variable, and a clearance rate, the "cl" variable.

```
data d;
  keep group t dose c;
  dose=1;
  clear=log(1.0),
  ke=log(0.5),
  ka=2.0;
  chol11=1;
  chol12=1;
  chol22=1;
  call streaminit (1);
  stderr=0.01;
  do group=1 to 12;
    u1=rand('normal');
    u2=rand('normal');
    keran=exp(ke+chol11*u1),
    clearran=exp(clear+chol12*u1+chol22*u2),
    do t=0 to 7 by 0.05;
      err=ifn(t=0.0,0,rand('normal',stderr));
      c=dose/clearran*keran*ka/(keran-ka)*(exp(-ka*t)-
        exp(-keran*t))+err;
      output;
    end;
  end;
run;
ods graphics off;
options tkgparm='dump';
option CMPOPT=(GENSYMNAMES);
proc tmodel data=d;
  performance nthreads=1 nothreading/timings;
  parms b1
    b2;
  parms beta1 %sysfunc(log(1.0))
    beta2 %sysfunc(log(2.0))
    beta3 %sysfunc(log(0.5))
    s2b1 1
    cb12 1
    s2b2 1;
  cl=exp(beta1+b1),
  ka=exp(beta2+b2);
  ke=exp(beta3);
  c=dose*ke*ka*(exp(-ke*t)-exp(-ka*t))/cl/(ka-ke),
  fit c/time=t optimizer=ormp(algorithm=activeset max-
    iter=200) outest=e dynamic;
  crosssection group;
  random b1 b2~normal([0,0],[s2b1*s2b1,s2b1*cb12,
    cb12*cb12+s2b2*s2b2])/ebesopt nquad=2 nopsd;
quit;
proc print data=e;
run;
```

The system of equations is defined by:

$$cl = \exp(\text{beta1} + b1),$$

$$ka = \exp(\text{beta2} + b2);$$

$$ke = \exp(\text{beta3});$$

$$c = \text{dose} * ke * ka * (\exp(-ke*t) - \exp(-ka*t))/cl/(ka-ke);$$

The statement "fit c/time=t optimizer=ormp (algorithm=activeset maxiter=200) outest=e dynamic" triggers creation of code to compute a derivative of the concentration in the body, c. To estimate the parameters beta1, beta2, beta3, s2b1, cb12, s2b2, first, second, and third order derivatives of the dependent variables, the "c" variable, the "ka" variable, the "ke" variable, and the "cl" variable, are computed with respect to each of the parameters. The computed partial derivatives are used by a gradient-based optimizer to compute the parameter estimates.

When the analytic model was submitted for execution using an existing compiler, the resulting program length was 9,519 lines of code with an allocated memory of 4,488,842 bytes. The program required 27 minutes and 4 seconds to execute. When the analytic model was submitted for execution using derivative definition program 122, the resulting program length was 2,513 lines of code with an allocated memory of 1,361,368 bytes. The program required 13 minutes and 38 seconds to execute. Thus, using derivative definition program 122 resulted in a 278.79% decrease in the number of lines of code, a 229.7% decrease in the amount of allocated memory, and a 98.5% faster execution time for a relatively simple analytic model. Complex analytic models may realize even more significant improvement in terms of the amount of allocated memory and execution time.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (a) generate a partial derivative for each equation of a system of equations with respect to a variable of a plurality of variables included in the system of equations to define a first set of partial derivative equations;
   (b) define a symmetric matrix that includes a row and a column for each of the defined first set of partial derivative equations, wherein each cell of the symmetric matrix includes an indicator of whether or not a direct dependency exists, and wherein the direct dependency exists when a first partial derivative on a first side of a partial derivative equation associated with a respective row includes a second partial derivative on a second side of the partial derivative equation that is included in the defined first set of partial derivative equations;
   (c) update the defined symmetric matrix to include an indicator of whether or not an indirect dependency exists, wherein the indirect dependency exists when the first partial derivative on the first side of the partial derivative equation associated with the respective row includes a third partial derivative on the second side of the partial derivative equation that depends on a fourth partial derivative that is included in the defined first set of partial derivative equations;
   (d) identify a solution row from the symmetric matrix that includes a requested partial derivative on the first side of the partial derivative equation;
   (e) identify a cell of the identified solution row that does not include the indicator that the direct dependency exists or that the indirect dependency exists;
   (f) identify the column from the symmetric matrix that includes the identified cell of the identified solution row;
   (g) remove the partial derivative equation associated with the identified column from the defined first set of partial derivative equations to define a second set of partial derivative equations, whereby removing the partial derivative equation associated with the identified column from the defined first set of partial derivative equations reduces a computer processing time to compute a derivative value for the requested partial derivative;
   (h) repeat (e) to (g) until no cell of the identified solution row is identified in (e); and
   (i) output derivative program code for the defined second set of partial derivative equations to compute the derivative value for the requested partial derivative when the output derivative program code is executed by the computing device.

2. The non-transitory computer-readable medium of claim 1, wherein updating the defined symmetric matrix to include the indicator of whether or not the indirect dependency exists is performed by applying a Floyd-Warshall algorithm.

3. The non-transitory computer-readable medium of claim 1, wherein, before (a), the computer-readable instructions further cause the computing device to:
   receive analytic model program code for an analytic machine learning model; and
   identify a partial derivative computation needed for execution of the received analytic model program code, wherein the requested partial derivative is the identified partial derivative computation.

4. The non-transitory computer-readable medium of claim 3, wherein, before (a), the computer-readable instructions further cause the computing device to:
   request creation of the output derivative program code to execute the identified partial derivative computation.

5. The non-transitory computer-readable medium of claim 4, wherein the request is sent to a compiler.

6. The non-transitory computer-readable medium of claim 4, wherein the request is sent to a scripting language interpreter.

7. The non-transitory computer-readable medium of claim 3, wherein (a) to (i) is repeated for each partial derivative computation identified as needed for execution of the received analytic model program code.

8. The non-transitory computer-readable medium of claim 7, wherein the output derivative program code is compiled with other code from the received analytic model program code.

9. The non-transitory computer-readable medium of claim 7, wherein the output derivative program code is inserted within other code from the received analytic model program code.

10. The non-transitory computer-readable medium of claim 3, wherein the output derivative program code is executed with other code from the received analytic model program code.

11. The non-transitory computer-readable medium of claim 3, wherein, after (i), the computer-readable instructions further cause the computing device to:
    instantiate an analytic model from the received analytic model program code;
    read an observation vector from an input dataset;
    compute a predicted characteristic of the read observation vector using the instantiated analytic model; and
    output the computed predicted characteristic of the read observation vector.

12. The non-transitory computer-readable medium of claim 3, wherein, after (i), the computer-readable instructions further cause the computing device to:
    instantiate an analytic model from the received analytic model program code by an event stream processing engine executing at the computing device;
    receive an observation vector from a first computing device connected to the computing device through a communication interface in an event block object of an event stream;
    compute a predicted characteristic of the received observation vector using the instantiated analytic model; and
    output the computed predicted characteristic of the received observation vector to a second computing device connected to the computing device through the communication interface.

13. The non-transitory computer-readable medium of claim 1, wherein the derivative program code is output by storing the derivative program code to the non-transitory computer-readable medium.

14. A computing device comprising:
a processor; and
a non-transitory computer-readable medium operably coupled to the processor, the non-transitory computer-readable medium having computer-readable instructions stored thereon that, when executed by the processor, cause the computing device to:
(a) generate a partial derivative for each equation of a system of equations with respect to a variable of a plurality of variables included in the system of equations to define a first set of partial derivative equations;
(b) define a symmetric matrix that includes a row and a column for each of the defined first set of partial derivative equations, wherein each cell of the symmetric matrix includes an indicator of whether or not a direct dependency exists, and wherein the direct dependency exists when a first partial derivative on a first side of a partial derivative equation associated with a respective row includes a second partial derivative on a second side of the partial derivative equation that is included in the defined first set of partial derivative equations;
(c) update the defined symmetric matrix to include an indicator of whether or not an indirect dependency exists, wherein the indirect dependency exists when the first partial derivative on the first side of the partial derivative equation associated with the respective row includes a third partial derivative on the second side of the partial derivative equation that depends on a fourth partial derivative that is included in the defined first set of partial derivative equations;
(d) identify a solution row from the symmetric matrix that includes a requested partial derivative on the first side of the partial derivative equation;
(e) identify a cell of the identified solution row that does not include the indicator that the direct dependency exists or that the indirect dependency exists;
(f) identify the column from the symmetric matrix that includes the identified cell of the identified solution row;
(g) remove the partial derivative equation associated with the identified column from the defined first set of partial derivative equations to define a second set of partial derivative equations, whereby removing the partial derivative equation associated with the identified column from the defined first set of partial derivative equations reduces a computer processing time to compute a derivative value for the requested partial derivative;
(h) repeat (e) to (g) until no cell of the identified solution row is identified in (e); and
(i) output derivative program code for the defined second set of partial derivative equations to compute the derivative value for the requested partial derivative when the output derivative program code is executed by the computing device.

15. The computing device of claim 14, wherein updating the defined symmetric matrix to include the indicator of whether or not the indirect dependency exists is performed by applying a Floyd-Warshall algorithm.

16. The computing device of claim 14, wherein, before (a), the computer-readable instructions further cause the computing device to:
request creation of the output derivative program code to execute a partial derivative computation.

17. The computing device of claim 16, wherein (a) to (i) is repeated for each partial derivative computation identified as needed for execution of an analytic model program code.

18. A method of identifying and eliminating unneeded derivatives from an analytic computation, the method comprising:
(a) generating, by a computing device, a partial derivative for each equation of a system of equations with respect to a variable of a plurality of variables included in the system of equations to define a first set of partial derivative equations;
(b) defining, by the computing device, a symmetric matrix that includes a row and a column for each of the defined first set of partial derivative equations, wherein each cell of the symmetric matrix includes an indicator of whether or not a direct dependency exists, and wherein the direct dependency exists when a first partial derivative on a first side of a partial derivative equation associated with a respective row includes a second partial derivative on a second side of the partial derivative equation that is included in the defined first set of partial derivative equations;
(c) updating, by the computing device, the defined symmetric matrix to include an indicator of whether or not an indirect dependency exists, wherein the indirect dependency exists when the first partial derivative on the first side of the partial derivative equation associated with the respective row includes a third partial derivative on the second side of the partial derivative equation that depends on a fourth partial derivative that is included in the defined first set of partial derivative equations;
(d) identifying, by the computing device, a solution row from the symmetric matrix that includes a requested partial derivative on the first side of the partial derivative equation;
(e) identifying, by the computing device, a cell of the identified solution row that does not include the indicator that the direct dependency exists or that the indirect dependency exists;
(f) identifying, by the computing device, the column from the symmetric matrix that includes the identified cell of the identified solution row;
(g) removing, by the computing device, the partial derivative equation associated with the identified column from the defined first set of partial derivative equations to define a second set of partial derivative equations, whereby removing the partial derivative equation associated with the identified column from the defined first set of partial derivative equations reduces a computer processing time to compute a derivative value for the requested partial derivative;
(h) repeating, by the computing device, (e) to (g) until no cell of the identified solution row is identified in (e); and
(i) outputting, by the computing device, derivative program code for the defined second set of partial derivative equations to compute the derivative value for the requested partial derivative when the output derivative program code is executed by the computing device.

19. The method of claim 18, wherein updating the defined symmetric matrix to include the indicator of whether or not the indirect dependency exists is performed by applying a Floyd-Warshall algorithm.

20. The method of claim 18, further comprising, before (a):
    receiving, by the computing device, analytic model program code for an analytic machine learning model; and
    identifying, by the computing device, a partial derivative computation needed for execution of the received analytic model program code, wherein the requested partial derivative is the identified partial derivative computation.

21. The method of claim 20, further comprising, before (a):
    requesting, by the computing device, creation of the output derivative program code to execute the identified partial derivative computation.

22. The method of claim 21, wherein the request is sent to a compiler.

23. The method of claim 21, wherein the request is sent to a scripting language interpreter.

24. The method of claim 20, wherein (a) to (i) is repeated for each partial derivative computation identified as needed for execution of the received analytic model program code.

25. The method of claim 24, wherein the output derivative program code is compiled with other code from the received analytic model program code.

26. The method of claim 24, wherein the output derivative program code is inserted within other code from the received analytic model program code.

27. The method of claim 20, wherein the output derivative program code is executed with other code from the received analytic model program code.

28. The method of claim 20, further comprising, after (i):
    instantiating, by the computing device, an analytic model from the received analytic model program code;
    reading, by the computing device, an observation vector from an input dataset;
    computing, by the computing device, a predicted characteristic of the read observation vector using the instantiated analytic model; and
    outputting, by the computing device, the computed predicted characteristic of the read observation vector.

29. The method of claim 20, further comprising, after (i):
    instantiating, by the computing device, an analytic model from the received analytic model program code by an event stream processing engine executing at the computing device;
    receiving, by the computing device, an observation vector from a first computing device connected to the computing device through a communication interface in an event block object of an event stream;
    computing, by the computing device, a predicted characteristic of the received observation vector using the instantiated analytic model; and
    outputting, by the computing device, the computed predicted characteristic of the received observation vector to a second computing device connected to the computing device through the communication interface.

30. The method of claim 18, wherein the derivative program code is output by storing the derivative program code to a non-transitory computer-readable medium.

* * * * *

UNITED STATES PATENT AND TRADEMARK OFFICE
CERTIFICATE OF CORRECTION

| | | |
|---|---|---|
| PATENT NO. | : 10,268,459 B1 | Page 1 of 1 |
| APPLICATION NO. | : 16/201012 | |
| DATED | : April 23, 2019 | |
| INVENTOR(S) | : Stacey M. Christian et al. | |

It is certified that error appears in the above-identified patent and that said Letters Patent is hereby corrected as shown below:

In the Specification

Column 15, Line 43:
Delete the phrase "clear = log(1.0)," and replace with --clear = log(1.0);--.

Column 15, Line 44:
Delete the phrase "ke = log(0.5)," and replace with --ke = log(0.5);--.

Column 15, Line 54:
Delete the phrase "keran = exp(ke + chol11*u1)," and replace with --keran = exp(ke + chol11*u1);--.

Column 15, Line 55:
Delete the phrase "clearran = exp(clear + chol12*u1 + chol22*u2)," and replace with --clearran = exp(clear + chol12*u1 + chol22*u2);--.

Column 16, Line 10:
Delete the phrase "cl = exp(beta1 + b1)," and replace with --cl = exp(beta1 + b1);--.

Column 16, Line 24:
Delete the phrase "cl = exp(beta1 + b1)," and replace with --cl = exp(beta1 + b1);--.

In the Claims

Claim 18, Column 20, Line 59:
Delete the phrase "(i) outputing," and replace with --(i) outputting,--.

Signed and Sealed this
Eighteenth Day of June, 2019

Andrei Iancu
*Director of the United States Patent and Trademark Office*